(12) United States Patent
Weijers et al.

(10) Patent No.: US 10,562,700 B2
(45) Date of Patent: **\*Feb. 18, 2020**

(54) BEVERAGE BREWING DEVICES

(71) Applicant: MDS Global Holding p.l.c., Gzira (MT)

(72) Inventors: Marcel Hendricus Simon Weijers, Hoogeveen (NL); Edward Hendrik Debski, Enschede (NL); Jorn Veldhuis, Enschede (NL); Rene Anthonius Weimar, Elst (NL)

(73) Assignee: MDS GLOBAL HOLDING PLC, Sliema (MT)

( * ) Notice: Subject to any disclaimer, the term of this patent is extended or adjusted under 35 U.S.C. 154(b) by 650 days.

This patent is subject to a terminal disclaimer.

(21) Appl. No.: 15/053,051

(22) Filed: Feb. 25, 2016

(65) Prior Publication Data

US 2016/0194148 A1    Jul. 7, 2016

Related U.S. Application Data

(63) Continuation of application No. 13/502,549, filed as application No. PCT/EP2009/064854 on Nov. 9, 2009, now Pat. No. 9,282,848.

(51) Int. Cl.
  B65D 85/804 (2006.01)
  A47J 31/40 (2006.01)
  (Continued)

(52) U.S. Cl.
  CPC .......... B65D 85/8043 (2013.01); A47J 31/36 (2013.01); A47J 31/407 (2013.01); A47J 31/4492 (2013.01)

(58) Field of Classification Search
  CPC .... B65D 85/804; B65D 85/8043; A47J 31/36; A47J 31/407
  (Continued)

(56) References Cited

U.S. PATENT DOCUMENTS 1,652,935 A * 12/1927 Goldfield ............... A47G 19/16
  99/317
3,102,465 A * 9/1963 Montesano ............ A47G 19/16
  206/0.5
(Continued)

FOREIGN PATENT DOCUMENTS

EP    0326685 A2    8/1989
EP    0334573 A1    9/1989
(Continued)

OTHER PUBLICATIONS

Extended European Search Report for a counterpart foreign application dated Aug. 5, 2014.

*Primary Examiner* — Erik Kashnikow
*Assistant Examiner* — Ashley Axtell
(74) *Attorney, Agent, or Firm* — Dorsey & Whitney LLP

(57) ABSTRACT

Capsules for holding in an interior space a portion of a product for preparing a food product include a first part (501) and a second part (502), arranged along a direction of extension (A). The first and second parts define at least a portion of an interior space (S) for holding a portion of a food product. At least one of the first and second parts of the capsule may include a substantially rigid connector portion (533) with at least one inlet for connecting to the apparatus wherein the at least one inlet defines a first flow direction for a fluid to be introduced into the inlet which first flow direction extends more than about 45 degrees to the direction of extension of the capsule. An apparatus may include an actuator for cooperating with the capsule.

15 Claims, 11 Drawing Sheets

(51) Int. Cl.
*A47J 31/44* (2006.01)
*A47J 31/36* (2006.01)

(58) Field of Classification Search
USPC .................. 222/92, 93, 94, 95, 325; 99/318
See application file for complete search history.

(56) References Cited

U.S. PATENT DOCUMENTS

| | | | |
|---|---|---|---|
| 3,471,058 A * | 10/1969 | Latham | B65D 21/086 190/107 |
| 4,853,234 A | 8/1989 | Bentlev et al. | |
| 4,913,316 A | 4/1990 | Richter | |
| 5,623,865 A * | 4/1997 | Sidiropoulos | A47G 19/16 99/323 |
| 6,053,475 A * | 4/2000 | Batschied | B67D 3/045 222/522 |
| 2002/0000441 A1 | 1/2002 | Redmond | |
| 2002/0048621 A1 | 4/2002 | Bovd et al. | |
| 2002/0078831 A1 * | 6/2002 | Cai | A47J 31/14 99/295 |
| 2004/0228955 A1 * | 11/2004 | Denisart | B65D 85/8043 426/590 |
| 2005/0015348 A1 * | 1/2005 | Knepler | A47J 31/4492 705/76 |
| 2006/0219725 A1 * | 10/2006 | Ferro | B65D 21/086 220/666 |
| 2006/0280841 A1 | 12/2006 | Cai | |
| 2007/0141215 A1 * | 6/2007 | Bunke | A23F 5/262 426/433 |
| 2007/0175335 A1 | 8/2007 | Liverani et al. | |
| 2008/0302251 A1 | 12/2008 | Rijskamp et al. | |
| 2009/0110775 A1 | 4/2009 | Rijskamp et al. | |
| 2009/0223375 A1 * | 9/2009 | Verbeek | A47J 31/405 99/287 |
| 2012/0213891 A1 * | 8/2012 | Simone | B65D 85/808 426/82 |
| 2013/0078337 A1 * | 3/2013 | Elfstrum | B65D 85/808 426/78 |
| 2013/0095214 A1 | 4/2013 | Ozanne et al. | |

FOREIGN PATENT DOCUMENTS

| | | | |
|---|---|---|---|
| EP | 0638486 A1 | 2/1995 | |
| EP | 1785369 A1 | 5/2007 | |
| WO | WO 2005044067 A1 | 5/2005 | |
| WO | WO 2006021405 A2 | 3/2006 | |
| WO | WO 2006037062 A1 | 4/2006 | |
| WO | WO 2006043096 A1 | 4/2006 | |
| WO | WO 2007114685 A1 | 10/2007 | |
| WO | WO-2007141202 A1 * | 12/2007 | ......... B65D 85/8043 |
| WO | WO 2008078988 A1 | 7/2008 | |
| WO | WO 2008090122 A2 | 7/2008 | |
| WO | WO 2008132571 A1 | 11/2008 | |

* cited by examiner

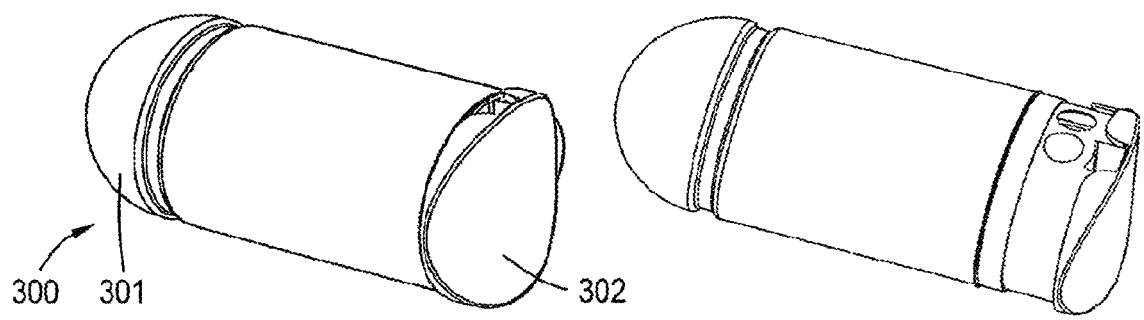
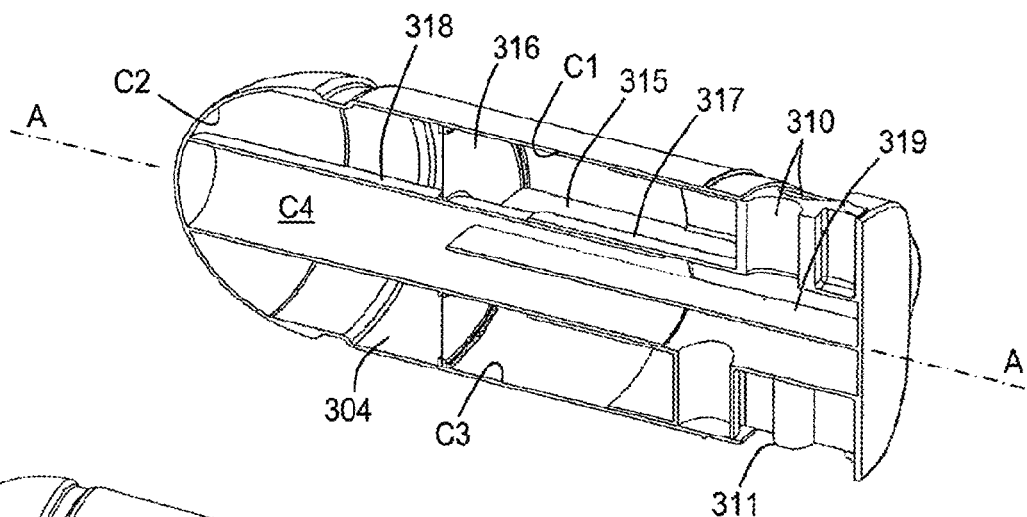
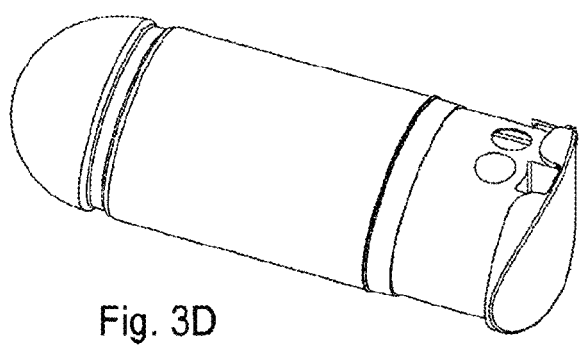
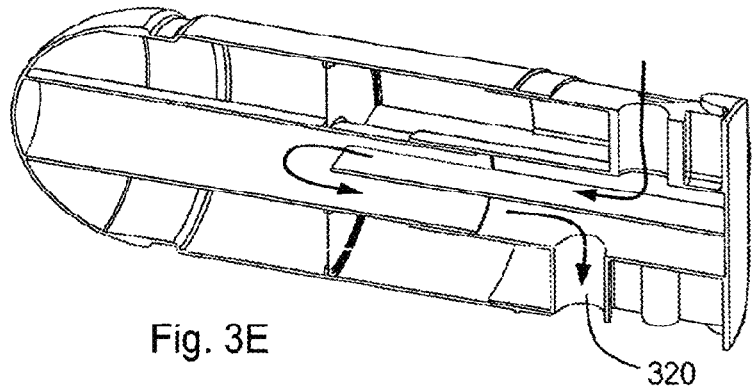

BEVERAGE BREWING DEVICES

CROSS-REFERENCE TO RELATED APPLICATIONS

This application is a continuation of U.S. patent application Ser. No. 13/502,549, filed Sep. 21, 2012, which is the National Stage of International Application No. PCT/EP2009/064854, filed Nov. 9, 2009, the contents of which are incorporated by reference herein.

DESCRIPTION

Technical Field

The present disclosure relates to the field of preparation and dispensing of products with products comprised in a capsule, in particular food products, more in particular liquid food products, e.g. beverages Improvements to capsules, to methods of preparing food products, in particular liquid food products, as well as to apparatus and assemblies for preparing food products, in particular liquid food products, are provided herein.

Background

It is known to prepare liquid food products, by providing one or more products comprised in a portion package or capsule, adding water to the product and dispensing the resultant liquid product mixture. Apparatus for preparation of beverages such as tea, espresso, cappuccino and other coffee varieties in such manner have become common household appliances and corresponding capsules for preparation of various beverages have become common groceries.

It is desired by manufacturers and consumers alike that the dispensed food product provides a consistent quality with each capsule. Reliability of the contents of the capsule and of the execution of a preparation recipe are therefore important. Further, consumers desire user-friendliness of a capsule, availability of different products to be prepared with a single apparatus, hygiene and low costs.

SUMMARY

To address at least some of the above-mentioned issues, several improvements are presented.

As a first improvement, a capsule for holding in an interior space a portion of a product for preparing a food product, e.g. a liquid food product such as a beverage in a food product preparation apparatus, is provided, which capsule comprises a first part and a second part. The first part and the second part are arranged along a direction of extension, and the first and second parts define at least a portion of the interior space for holding said portion of a food product. At least one of the first and second parts of the capsule comprises a substantially rigid connector portion with at least one inlet for connecting to the apparatus, preferably also at least one outlet. The at least one inlet defines a first flow direction for a fluid to be introduced into the inlet, which first flow direction extends more than about 45 degrees to the direction of extension of the capsule, preferably substantially perpendicular, e.g. radial, thereto.

Such capsule facilitates reliable connecting of the apparatus to an inlet (and if appropriate an outlet) of the capsule, e.g. with a predictable and/or constant force during operation such as preparation of the food product. Capsules of different volumes may have substantially identical or identically sized connector portions but different sizes in the first direction of extension, facilitating use of various capsules with a single apparatus without requiring an adapter. Deformation of the capsule in the direction of extension may be facilitated substantially without affecting coupling to the apparatus. Such deformation may be active, e.g. by the apparatus or an operator acting on capsule, or passive, e.g. by pressurizing the capsule, by swelling of the capsule contents or by separation of movably arranged parts of the capsule. This facilitates construction and manufacture of the capsule and allows reduction of chances of leakage, spilling and/or bypass of fluid around the capsule.

The outlet may define a second flow direction for a food product to be dispensed which second flow direction extends more than about 45 degrees to the direction of extension of the capsule, preferably substantially perpendicular thereto. The first and second flow directions may extend substantially parallel and/or in a substantially direct line.

Such capsules provide efficient use of space and predictable pressure to the connector and the capsule as a whole.

Associated therewith, an assembly for preparing a portion of a food product, e.g. a liquid food product such as a beverage, is provided. The assembly comprises a capsule of the above-described type and an apparatus for preparing a food product comprising a receptacle for operatively holding said capsule. The receptacle comprises a deformable portion and/or an actuator for manipulating at least a portion of said capsule. By the deformable portion, the apparatus can accommodate capsules of different sizes (volumes). The deformable portion may be configured to compress at least a portion of the capsule. Deformation may be accomplished by an actuator. Different actuators may be provided for manipulating a capsule.

As another improvement, a capsule for holding in an interior space a portion of a product for preparing a food product, e.g. a liquid food product such as a beverage in a food product preparation apparatus is provided. The capsule comprises an information portion comprising machine readable information markings. The portion is formed such that at least upon opening of the capsule for preparing said food product said portion is modified, e.g. deformed or destroyed, so as to present at least one of no information markings, modified information markings and illegible information markings to the apparatus.

Associated therewith, an assembly for preparing a portion of a liquid food product such as a beverage, comprises such a capsule and an apparatus for preparing food products. The apparatus comprises a receptacle for operatively holding said capsule and a reader configured to read said information markings. In the assembly at least one of the information portion and the machine is formed such that upon at least one of opening or use of the capsule for preparing said food product with said apparatus said information portion is modified, e.g. deformed or destroyed, so as to present at least one of no information markings, modified information markings and machine-illegible information markings to the reader.

The machine readable information markings allow to identify the contents of the capsule by the apparatus. The apparatus may then be operated to prepare said food product, which may be a liquid food product, based on the information provided by the information markings such as executing a predetermined preparation recipe. For this, the apparatus may comprise a controller for operation. The controller may be connected with a, possibly programmable, memory for storing instructions and/or recipes. The information markings may identify one or more a stored instructions or recipes, possibly user-selectable e.g. via an interface provided on the apparatus. The instructions of the information markings may be configured to define an entire recipe. By forming the capsule such that the information markings are modified upon opening of the capsule evidence of previous use of and/or (attempts of) tampering with the capsule and/or its contents which may otherwise go unnoticed is provided which may be used to affect, in particular to prevent, operation of the apparatus and preparation of the product to prevent not meeting standards of quality and/or hygiene for the product to be prepared. The portion may be actively deformed by one or more actuators and/or passively deformed by one or more steps in the preparation process.

As another improvement, a capsule for holding in an interior space a portion of a food product for preparing a liquid food product in a liquid food product preparation apparatus comprises a substantially rigid connector portion for connecting to the apparatus, wherein said connector portion provides a plurality of inlets for a fluid, in particular a liquid or a gas, and configured to couple at least substantially liquid tight, preferably also gas tight, to a corresponding outlet for a fluid of the apparatus and at least one outlet for a fluid.

Associated therewith, an assembly for preparing a portion of a liquid food product such as a beverage, is provided. The assembly comprises an apparatus for preparing a food product, and a capsule which comprises a substantially rigid connector portion for connecting to the apparatus and which connector portion provides a plurality of inlets for a fluid. The apparatus comprises a receptacle for operatively holding said capsule and at least one outlet for a fluid corresponding to an inlet of the capsule. In the assembly the at least one outlet of the apparatus and the corresponding inlet of the capsule are configured to couple with an at least substantially liquid tight connection, preferably also gas tight.

The connector portion of the capsule allows coupling of a predetermined inlet to a corresponding outlet of the apparatus with a substantially liquid-tight, preferably also gas tight connection. This increases hygiene of the apparatus and improves user-friendliness of the assembly, by preventing spilling within the apparatus and/or mixing of successively prepared products. A substantially rigid connector facilitates achieving such coupling since it improves positioning of the connector portion and thus of the inlets. It further reduces accidental deformation compared to a soft or flexible material. The connector portion may be or comprise a somewhat resilient portion or material, e.g. a rubber-like material, to provide a seal between a capsule inlet and an apparatus outlet. The connector portion comprising an outlet ensures reliable positioning of the outlet. This also facilitates dispensing the product straight from the capsule without requiring a conduit and/or spout of the apparatus.

As another improvement, a capsule for holding in an interior space a portion of a food product for preparing a liquid food product comprises a first part and a second part which first and second parts define at least a portion of the interior space for holding said portion of a food product. The parts are slideably connected and are arrangeable in a first relative position and a second relative position. In the first relative position at least one inlet and/or at least one outlet for a fluid is inaccessible and/or closed, and in the second relative position the at least one inlet and/or the at least one outlet is accessible, openable and/or open.

Associated therewith, an assembly for preparing a portion of a liquid food product such as a beverage, is provided. The assembly comprises an apparatus for preparing a food product and such aforementioned capsule comprising a first part and a second part which first and second parts defining at least a portion of the interior space for holding said portion of a food product and being movably connected and arrangeable in a first relative position and a second relative position. The apparatus comprises a manipulator for moving at least one of the first part and the second part of said capsule thereof from at least the first relative position to the second relative position.

Associated therewith, a method of preparing a first food product with such capsule and an apparatus for preparing a food product comprising a portion for operatively holding said capsule is provided. In the method, said capsule comprises a first part and a second part, which first and second parts define at least a portion of the interior space for holding a portion of a second food product, and which parts are movably connected and are arrangeable in a first relative position and a second relative position, wherein in the first relative position at least one of at least one inlet and at least one outlet for a fluid is at least one of inaccessible and closed, and wherein in the second relative position the at least one of at least one inlet and at least one outlet for a fluid is at least one of accessible, openable and open. The method comprises the steps of: arranging said capsule in the apparatus in the first relative position, arranging said first and second parts in the second relative position and opening at least one inlet, preferably also at least one outlet, preparing said first food product by addition of a fluid to said second food product via said inlet, dispensing said first food product via at least one outlet, preferably said at least one outlet, and re-arranging said first and second parts in the first relative position and closing said at least one inlet, preferably also said at least one outlet.

The capsule, assembly and method facilitate providing increased hygiene of the capsule and its contents, of the apparatus and of surroundings by having the first and second parts in the first relative position during storing and handling. The inlet is only made available for use after arranging the parts in the second relative position. Chances of leaking of the capsule are thus reduced. In appropriate cases the same holds for one or more outlet openings. In such a case, and if the first and second parts are movably connected so as to be arrangeable in the first position after at least one of opening and use of the capsule, the capsule may be closed after use. Thus, subsequent leaking of the capsule and portions of food products remaining in the capsule, e.g. coffee grounds, may be prevented.

Such a capsule comprising a first part and a second part which first and second parts are movably connected and arrangeable in a first relative position and a second relative position may comprise an information portion comprising machine readable information markings as described above. Said information portion may be attached to both the first part and the second part in the first position. Upon rearranging the capsule into the second position said information portion may be modified, e.g. at least one of deformed, broken and detached from at least one of the first and second parts. Thus, indication of a displacement of both parts with respect to each other from the first relative position to the second relative position is provided, e.g. for signaling tampering and/or previous use of the capsule.

In such a capsule comprising a first part and a second part which first and second parts are movably connected and arrangeable in a first relative position and a second relative position, may be configured such that in the first relative position the parts define a first volume and in the second relative position the parts define a second volume larger than the first volume. This allows to provide an underpressure in the interior space which may prevent leaking of the capsule upon its opening. It further allows to reduce capsule volume for reasons of storage economy and/or preserving freshness of capsule contents and to provide volume for introduction of a fluid into the interior space of the capsule for mixing with the contents within the capsule. Such introduction would otherwise necessitate displacement and/or compression of the contents of the capsule. It further allows suction of air into the interior space of the capsule to cause scattering of particulate matter within the capsule to improve subsequent mixing and/or wetting thereof.

Such a capsule comprising a first part and a second part which first and second parts are movably connected and arrangeable in a first relative position and a second relative position, may be configured such that the first and second are arrangeable also in a third relative position. In the third relative position a third volume, different from the first and second volumes, is defined and/or one or more further inlets and/or a further outlets are accessible, openable and/or open. Thus, further flexibility of using the capsule is provided.

A capsule for holding in an interior space a portion of a food product for preparing a liquid food product may comprise at least one divider for dividing the volume of the interior space into a plurality of separate compartments, e.g. for holding different portions of food product or beverage or for holding portions of different food products or beverages. At a predetermined time during preparation of the liquid product a particular component may be dispensed and/or the components of two or more compartment may be mixed. As an improvement of such a capsule the capsule is provided with a destructor arranged at least partially within the interior space for destructing said at least one divider. The destructor may be rigid or movable and may be operable from outside the capsule. Operation of the destructor may be dependent on a deformation of the capsule.

As another improvement, a capsule for holding in an interior space a portion of a product for preparing a food product in a food product preparation apparatus comprises a movable actuator, e.g. a mixer, a propeller or a destructor, arranged at least partially in the interior space and being configured to be operable from outside the interior space. This allows e.g. improved dispensing or mixing of at least a product contained within the capsule with a fluid.

SHORT DESCRIPTION OF THE DRAWINGS

The above-described aspects and others will hereafter be more fully explained with reference to the drawings showing an embodiment of the invention by way of example.

It is noted that the drawings are schematic, not necessarily to scale and that details that are not required for understanding the present invention may have been omitted. The terms "upward", "downward", "below", "above", and the like relate to the embodiments as oriented in the drawings.

FIGS. 3A-3E are perspective and cross-sectional views of a third embodiment of a capsule in a first state (3A), a second state (3B-3C) and a third state (3D-3E), respectively;

Figure 6:
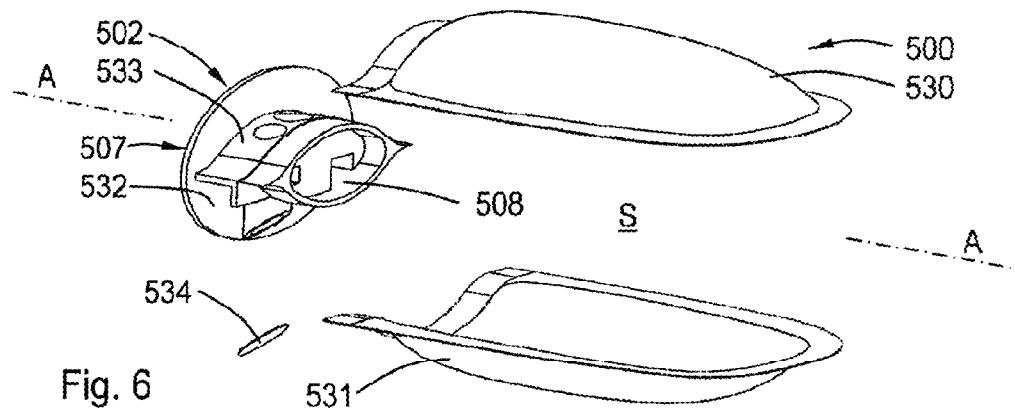
FIGS. 6, 7 and 8 are explosion views of different embodiments of a capsule.
Figure 7:
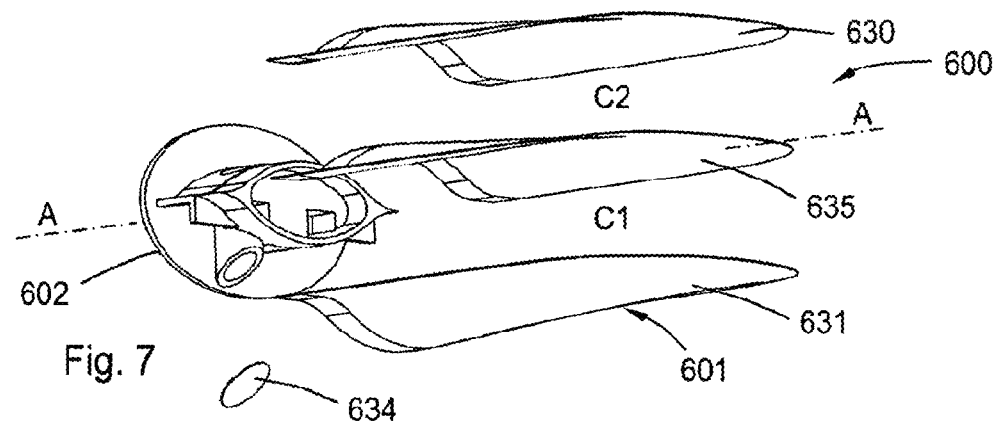
Figure 8:
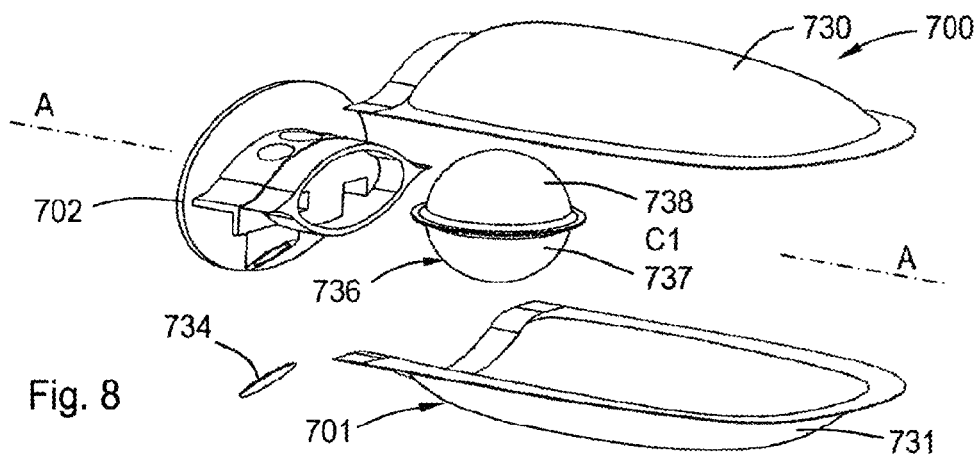

FIGS. 13A-13E indicate a method of preparing a beverage with the capsule of FIG. 6;

FIGS. 14A-14D indicate a method of preparing a beverage with the capsule of FIG. 7;

FIGS. 15A-15D indicate a method of preparing a beverage with the capsule of FIG. 8.

In the Figures, embodiments are denoted by hundreds (100, 200, etc.) and elements that are at least substantially identical or that perform an at least substantially identical function are denoted by the same numeral after the hundred (e.g. 101, 201, 301 denote a body of capsules 100, 200 and 300, respectively, etc.).

DETAILED DESCRIPTION OF EMBODIMENTS

Figure 1A:
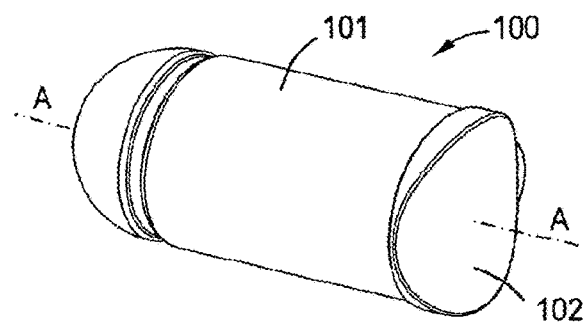
FIGS. 1A-1B are a perspective view and a cross-sectional view, respectively of a first embodiment of a capsule in a first state.
Figure 1B:
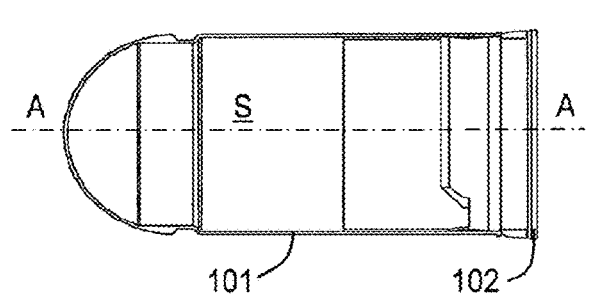
Figure 1C:
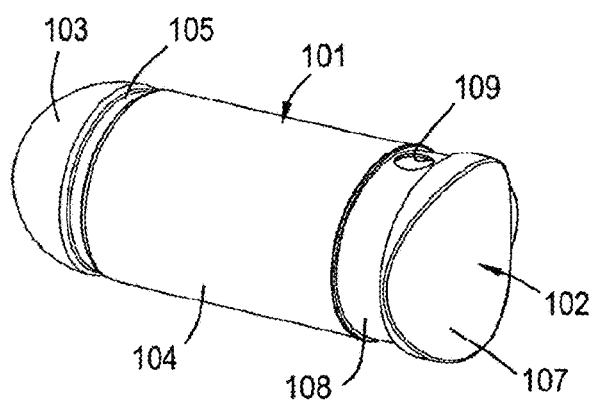
FIGS. 1C-1D are a perspective view and a cross-sectional view, respectively of the capsule of FIGS. 1-2 in a second state.
Figure 1D:
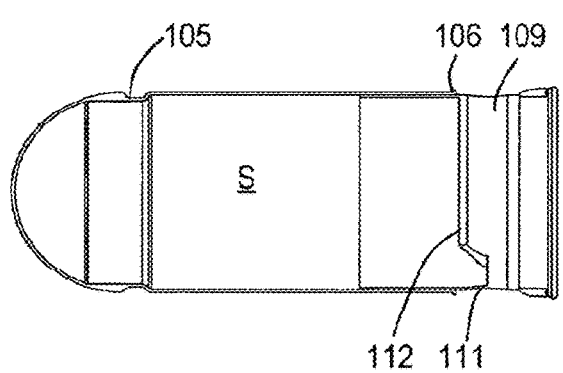
Figure 1E:
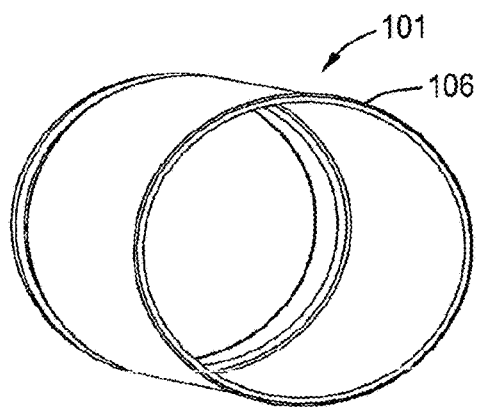
FIGS. 1E-1F are perspective views of two parts of the capsule of FIGS. 1A-1D.
Figure 1F:
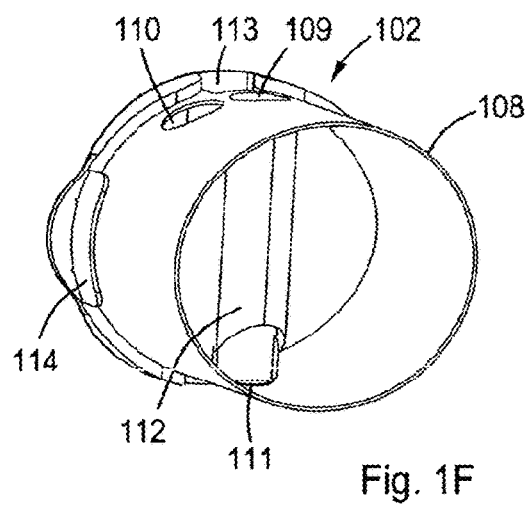
Figure 2A:
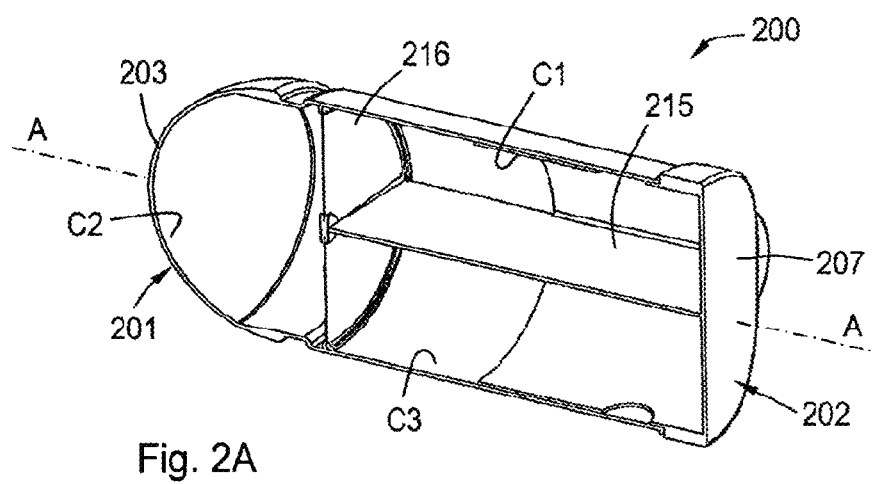
FIGS. 2A-2B are perspective cut-away views of a second embodiment of a capsule in a first state and a second state, respectively.
Figure 2B:
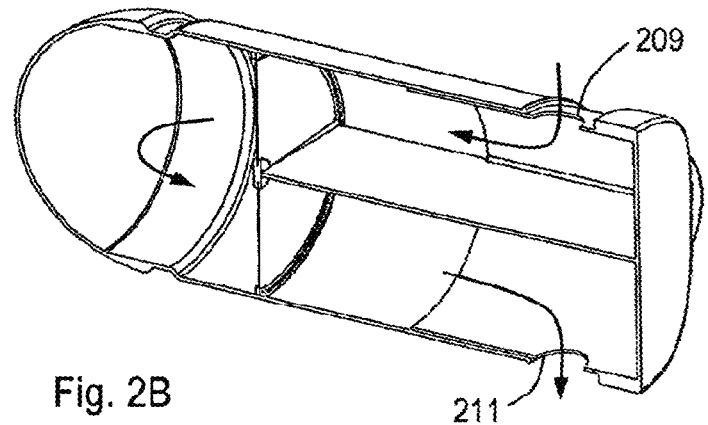
Figure 4A:
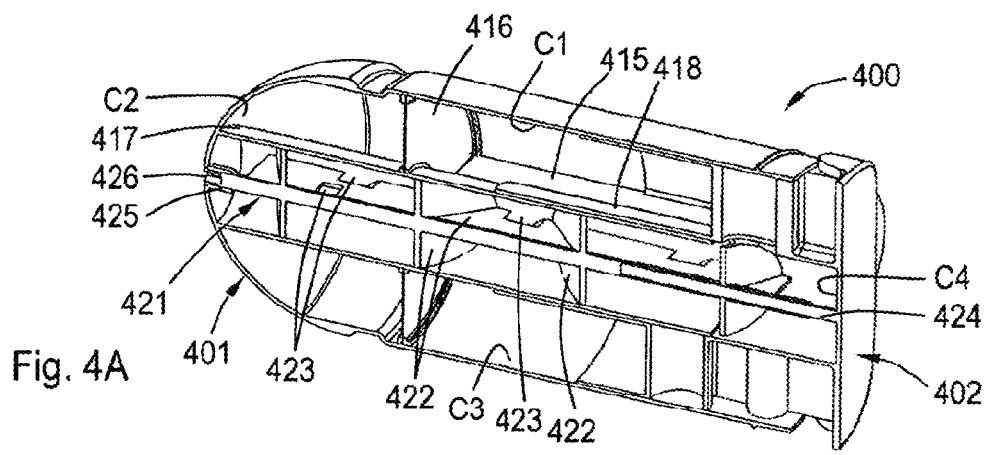
FIGS. 4A-4B are perspective cut-away views of a fourth embodiment of a capsule in a first, second and third state, respectively.
Figure 4B:
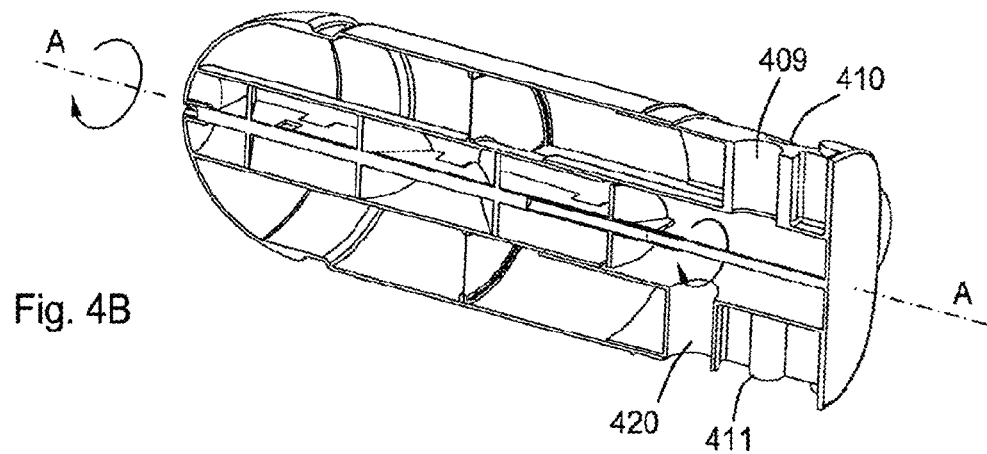

FIGS. 1A-1F show a capsule 100, FIGS. 2A-2B show a capsule 200, FIGS. 3A-3E show a capsule 300 and FIGS. 4A-4B show a capsule 400. FIGS. 6-8 show capsules 500, 600, and 700, respectively.

The general construction and operation of the capsules of FIGS. 1-4C will be explained with reference to FIGS. 1A-1F.

The capsule 100 has generally elongated tubular shape with a main direction of extension along an axis A and a substantially circular shape in cross-section perpendicular to the axis A, best seen in FIGS. 1E and 1F. The capsule 100 may however have any other basic shape, e.g. be discoid along the axis A and/or having an ellipsoidal, polygonal, pillow-shaped and/or irregular cross-section section perpendicular to the axis A.

The capsule 100 comprises a first part or body 101 and a second part or cap 102 which are connectable together to form the capsule 100. The body 101 and the cap 102 are substantially rigid and may be made of any material which is substantially rigid and which is compatible with the product (to be) contained within the capsule, e.g. plastic, metal and/or cardboard, which material may be coated or laminated on an inner and/or outer side, etc. Advantageously, the capsule is liquid tight, and/or gas (e.g. air) tight, at least on a time scale of a required minimum life time of the product to be stored within the capsule (e.g. "Best used before"-date).

The body 101 comprises along the direction of extension A a closed tip portion 103 and a hollow sleeve 104 providing an open end opposite the tip portion. As shown, the body 101 may be provided with a connector structure 105 for coupling to a matching connector structure and/or an actuator of an apparatus. Here the connector structure 105 is in the form of a dent in at least the exterior of the sleeve 104 and which here extends around the circumference of the sleeve 104. The body 101 further comprises a rim 106 extending along at least a portion of the sleeve 104 and protruding radially from the sleeve 104 with respect to axis A.

The cap 102 forms a connector portion for connecting to an apparatus and comprises a closed end portion 107 and a hollow sleeve 108 providing an open end opposite the end portion 107. The end portion 107 extends radially from the sleeve 108 with respect to the direction of extension A. In (the sleeve 108 of) the cap 102 two inlets 109, 110 and an outlet 111 are provided, which are in fluid communication with a hollow space defined by the end portion 107 and the sleeve 108. The directions of opening of the inlets 109, 110 and outlet 111, and thus the flow direction of a fluid there through are substantially radial with respect to the axis A. The inlet 110 is provided with a conduit 112 extending into the interior of the cap 102 (best visible in FIG. 1F). The cap 102 may comprise a connector structure 113 for coupling to a matching connector structure and/or an actuator of an apparatus. The cap 102 further comprises a tab 114 which will be discussed in more detail later with respect to FIG. 5.

The sleeve portion 108 of the cap 102 fits inside the sleeve 104 of the body 101 with an at least liquid tight seal to movably connect the body 101 and the cap 102 and to form the capsule 100. When connected, the body 101 and the cap 102 together define a hollow interior space S in which a product may be contained.

When connected, the body 101 and cap 102 are arrangeable in a first state, shown in FIGS. 1A, 1B in which the parts 101, 102 are arranged in a first relative position, and in a second state, different from the first state, shown in FIGS. 1C, 1D in which the parts 101, 102 are arranged in a second relative position.

In the first state, the cap 102 and the body 101 are fit together closely, here with the end portion 107 of the cap 102 abutting the sleeve 104 of the body 101. At least a portion of the sleeve 104 of the body 101 fully covers the inlets 109, 110 and the outlet 111 such that they are closed and inaccessible. The interior space S of the capsule 100 then has a first volume V1.

In the second state, the body 101 and the cap 102 are pulled slightly apart along the direction of axis A, e.g. by an apparatus acting on connector structures 105, 113. In this second state, the inlets 109, 110 and the outlet 111 are outside the sleeve 104 of the body 101 so that they are accessible and the inlets and outlets may be open or openable when otherwise closed, e.g. with a cover foil (not shown). The interior space S of the capsule 100 then has a second volume V2>V1.

In the second state, cap 102 provides a substantially rigid possibly somewhat flexible connector portion for connecting to an apparatus. Each inlet 109, 110 may serve to couple and seal at least substantially liquid tight to a corresponding outlet for a fluid of the apparatus.

Introducing a fluid, e.g. water, to the interior space S of the capsule via an inlet 109, 110, at a relatively low-pressure and/or intermittently allows mixing of the liquid and the capsule contents within the capsule. The resultant mixture may be dispensed straight from the outlet 111 into a container, e.g. a mixed beverage into a drinking glass, with the outlet 111 defining the flow direction for the mixture. Providing a high-speed liquid jet to the capsule 100 through inlet 109 and out of the outlet 111 may cause a venturi-effect between the end of the conduit 112 and the outlet 111 to pump liquid contents contained in the interior space S out of said space S, during which the liquid and the contents of the capsule may be well mixed. Alternatively or in combination therewith, a fluid such as a liquid or a gas may be introduced into the capsule 100, e.g. via the inlet 110 to empty and/or assist or ensure emptying of the capsule. Using carbonated water for such liquid jet of is conceivable; introducing $CO_2$ in the capsule, e.g. via inlet 110 may counteract degassing of the carbonated water when mixing.

After preparing and dispensing the product the capsule 100 can be restored to the first state for hygienic disposal.

Suitable contents of the capsule are liquids, syrups and concentrates for beverages or flowable particulate material such as powdered milk and soups. Liquid to be added, in particular water, may be cold, hot or have any other desired temperature.

In an alternative embodiment (not shown) the body 101 and cap 102 is configured to provide first and second states differing by a relative rotation about the axis A instead of a relative translation as shown, so as to (un-)cover, (un-)block and/or open one or more inlets and/or outlets. In yet another embodiment (also not shown), the body 101 and cap 102 are connected with a screw-coupling, providing both rotation and translation.

Referring now to FIGS. 2A-2B, the capsule 200 differs mainly from the capsule 100 in that a first divider 215 and a second divider 216 are provided in the interior space S of the capsule 200, which separate the interior space S in three separate compartments, C1, C2, C3. The first divider 215 is wall portion attached to and extending from the end portion 207 of the cap 202 towards the tip portion 203 of the body 201 and spanning the interior width of the capsule 200. The second divider 216 is a filter attached to the first divider 215 and extending radially with respect to the axis A and spanning the interior width of the compartment C2 to close the compartment off from the compartments C1, C3. The dividers 215, 216 are attached to the cap 202 and movable with respect to the body 201, such that upon rearranging the body 201 and the cap 202 from the first state of the container (FIG. 2A) to the second state of the container (FIG. 2B) the position of the filter 216 is changed and a change of the volume of the interior space S of the capsule 200 works on compartment C2.

The inlet 209 of the capsule 200 is in direct communication with the first compartment C1 and the outlet 211 of the capsule 200 is in direct communication with the third compartment C3. Due to the divider 215, a liquid, e.g. hot water, introduced into the capsule 200 via inlet 209 can only exit the outlet 211 after having passed the second compartment C2 as indicated by the arrows in FIG. 2B. The inlet 209 may be configured to at least partially define a predetermined flow direction for a fluid introduced into the inlet 209 with a flow direction having a component towards the tip portion 203 and the second compartment C2.

The capsule 200 is very well suited for particulate matter, e.g. coffee or loose-leaf tea contained in the second compartment C2, since all water must pass this compartment C2 while the particulate matter is held by the filter. The increased volume of the second compartment C2 allows swelling of the coffee powder or tea leaves contained therein during brewing of the beverage. As in capsule 100, a gas or air pressure may be provided via an inlet (not visible) to assist emptying the capsule from fluids. As in capsule 100, when pressure builds inside the capsule 200 the sleeve 208 of the cap 202 is pressed against the sleeve 204 with increased force and the interconnection is sealed more tightly.

Referring now to FIGS. 3A-3E, the capsule 300 comprises first to fifth dividers 315-319. The first and second dividers 315 and 316 are substantially equal in construction and function to the dividers 215 and 216 of the capsule 200 discussed above and divide the interior space of the capsule 300 in three compartments C1-C3. Likewise, an inlet 310 is in direct communication with the first compartment C1 and an outlet 311 is in direct communication with the third compartment C3.

The third and fourth dividers 317, 318 are substantially tubular, extend substantially along the direction of extension A from the body 301 and the cap 302, respectively, and together define a fourth compartment C4 within the interior space S of the capsule 300. The fourth compartment C4 is separated substantially fluid-tightly from the other compartments C1-C3. The fifth divider 319 extends from the cap 302 within the compartment C4 and spans the interior width of the compartment C4. The fourth compartment is in fluid connection with individual inlet 309 and outlet 320.

As the capsules 100 and 200, the capsule 300 is arrangeable in a first state (FIG. 3A) with the inlets and outlets inaccessible, and in a second state (FIGS. 3B, 3C) in which inlets 309 and 310 and a first outlet 311 are open for coupling with an apparatus. In the second state the outlet 320 of the fourth compartment C4 is closed (by the sleeve 304) and inaccessible from outside the capsule 300. In the second state the capsule 300 is configured to be used with inlets 310 and outlet 311 as described before. The capsule 300 is further arrangeable in a third state (FIGS. 3D-3E) in which the body 301 and cap 302 are in a third relative position such that (also) the outlet 320 is open. In the third state the fourth compartment C4 may be used for preparing a product by introduction of a fluid therein via inlet 309, mixing the fluid with a product contained in the fourth compartment C4 and dispensing the resultant product via outlet 320. The fifth divider 319 facilitates proper mixing within the fourth compartment C4, as discussed for divider 215 in capsule 200 (see the arrows in FIG. 3E).

The first, second and fifth dividers 315, 316, 319 are optional, depending on the product contained in the capsule. The capsule 300 is particularly suited for storing or preserving different types in separate conditions and/or for dispensing different products subsequently, e.g. coffee with a cream layer on top, soup with croutons, dairy products and cereals, or differently coloured cocktails.

In an alternative embodiment (not shown) such capsule may be comprise an inlet for the fourth compartment C4 which is closed in the second state and open in the third state. Closing off an inlet or outlet may also be due to cooperation between the third and fourth dividers 317, 318. Further compartments may be made available in similar fashion. Separated compartments need not be coaxial as shown but may be juxtaposed. They may have equal or different volumes.

Referring now to FIGS. 4A, 4B, a capsule 400 is shown which, like capsule 300, comprises first to fourth dividers 415-418 to divide the interior space of the capsule in four compartments C1-C4. Substantially identical to capsule 300, capsule 400 is also arrangeable in a first state (FIG. 4A), a second state (not shown) and a third state (FIG. 4B) for intentionally closing and opening inlets 409, 410 and outlets 411 and 420. Different from capsule 300, capsule 400 lacks a fifth divider. Instead, a stirrer or mixer 421 is provided which comprises a plurality of blades 422 and openings 423. The mixer 421 may be a passive labyrinth but in the shown embodiment the mixer 421 is movably (rotatably) mounted along the axis A to an elongated spindle 424 and a fitting 425, such that the mixer 421 substantially stays in place in the first to third states of the capsule 400. On an end of the mixer 421 a connector 426 is provided, e.g. an I- or X-shaped slot or blade or a hexagonal coupling, for coupling to an actuator (not shown) for operating the mixer 421 by rotating it about the axis A by hand and/or machine (FIG. 4B). The mixer 421 facilitates thorough beating of a product in the fourth compartment C4 and/or mixing the product with a liquid introduced via inlet 409, e.g. for use with poorly-miscible products, or to provide whipped cream or foamed milk for cappuccino.

Another movable actuator may be provided in similar fashion, such as a propeller for dispensing a thick fluid and/or particulate matter, e.g. cereals, croutons etc., from the capsule, e.g. a screw worm. A movable actuator may be provided in any compartment or undivided interior space S of a capsule.

Figure 5:
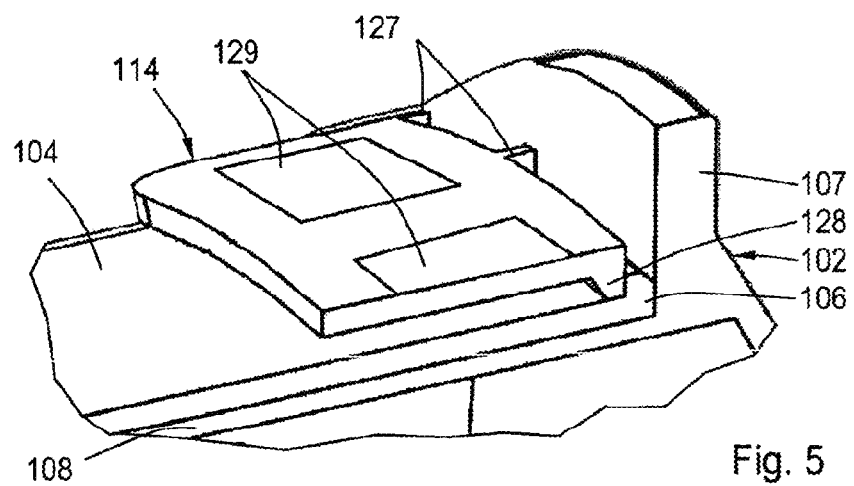
FIG. 5 is a detail of a tamper-evident information tab.

FIG. 5 shows a partially cut-away detail of capsule 100, which may be substantially identical for any capsule 100-400. FIG. 5 shows the tab 114, best visible otherwise in FIG. 1E, and (portions of) the sleeve 104 and rim 106 of the body 101 and the end portion 104 and sleeve 105 of the cap 102. The tab 114 is attached to the cap 102 with one or more ribs or necks 127. The tab 114 comprises a latch 128 and machine readable information markings 129, e.g. presenting tactile or relief codes, optical marking such as bar code, matrix code, colour code, reflection code and/or magnetic or RFID code, etc.

After manufacture, one or both parts 101, 102 of the capsule 100 may be filled at least partially with a product. The capsule 100 is then assembled by inserting the cap 102 into the body 101 until the end portion 107 of the cap 102 abuts the rim 106 of the body 101. The latch 128 and the rim 106 form cooperating latching features to provide a snap-fit for attaching the cap 102 to the body 101. The tab 114, the rim 106 and the necks 127 are formed such that opening of the capsule 100 causes deformation and/or rupture of one or more of the necks 127 and therewith at least partial modification and/or destruction of the tab 114. Thus, correct positioning of the markings 129 for a machine reader is substantially hindered or prevented and, at least machine-detectable, tamper-evidence is provided.

Figure 6A:
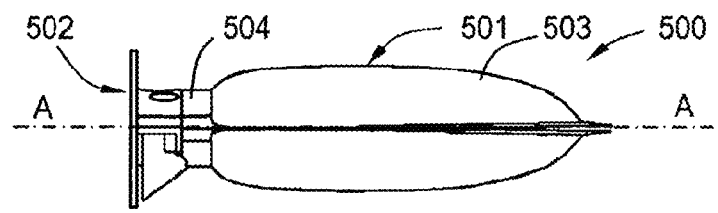
FIG. 6A is a regular (i.e. not exploded) side view of the capsule of FIG. 6 and FIGS. 6B and 6C are partial cross-section views of two variants.

FIGS. 6-8 show capsules 500, 600 and 700, respectively. Their general construction and operation will now be explained with reference to capsule 500 in FIGS. 6 and 6A. The capsule 500 has a generally elongated flattened shape extending in a main direction of extension A. The capsule 500 comprises a first part or body 501 and a second part or cap 502, which are connectable together to form the capsule 500.

Different from the bodies 101-401, the body 501 is formed with plural (here: two) sheets 530 and 531 attached together, e.g. by gluing, welding, or rolling along a seam. The body 501 comprises a closed tip portion 503 and a hollow sleeve portion 504 providing an open end opposite the tip portion 503. The body 501 may be substantially rigid or at least partially easily deformable, e.g. flexible and/or pliable. The cap 502 is substantially rigid, possibly (partially) resilient to facilitating a liquid tight seal to an apparatus. The capsule 500 may be made of any material which is compatible with the product (to be) contained within the capsule, e.g. plastic, metal and/or cardboard, which material may be coated or laminated on an inner and/or outer side, etc.

The cap 502, to be treated in more detail below with respect to FIGS. 9A-11, forms a connector portion for connecting to an apparatus and comprises an end portion 507 and a hollow sleeve 508. The end portion 507 comprises an optional end plate 532 and a conduit block 533. The sleeve 508, here also the conduit block 533, is formed pillow-shaped to closely accord the shape of the body 501 so as to fits inside the sleeve 504 of the body 501 with an at least liquid tight seal and prevent points or zones of stress and/or leaks at the interconnection between the body 501 and the cap 502.

A rigid body 501 may be movably connected to the cap 502 to form a capsule of the type of capsules 100-400, also possibly comprising a tab 114. Alternatively and discussed in the following, (the sleeve 504 of) the body 501 is flexibly pliable and fixed to (the sleeve 508 of) the cap 502. When connected, the body 501 and the cap 502 together define a hollow interior space S in which a product may be contained.

Figure 6B:
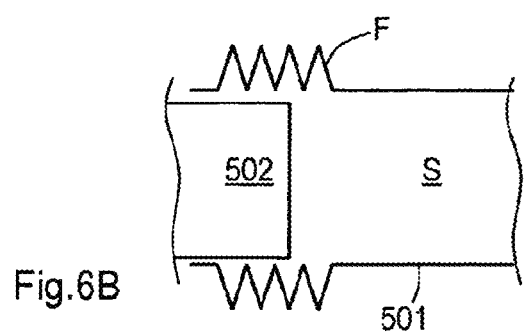
Figure 6C:
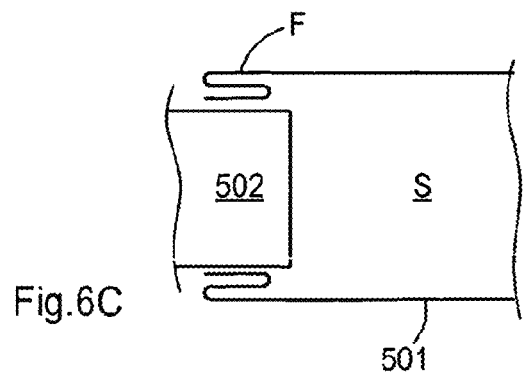

As shown in FIGS. 6B and 6C, a flexible body 501 may be fixed to the cap 502 and comprise one or more folds F, e.g. in harmonica fashion with folded sections extending substantially radial to the direction of extension A (FIG. 6B) and/or with sections lying substantially parallel to the direction of extension A (FIG. 6C). In folded state (e.g. FIGS. 6B, 6C), (the tip portion of) the body 501 and the cap 502 are arranged in a first relative position and define a first volume V1. In unfolded state (e.g. FIG. 6A) (the tip portion of) the body 501 and the cap 502 are arranged in a second relative position and define a second volume V2>V1. Unfolding may be in portions, to provide a third or further state with according volume V3, V4 etc. One or more folded sections may overlap the sleeve 508, whereby one or more inlets and or outlets may be inaccessible and/or closed in a (partially) folded state and be accessible of open in a (partially) unfolded state. Folds may further be used to provide a tamper-evident portion.

To be discussed in more detail below, the cap 502 provides a plurality of inlets and outlets for using the capsule. Shown in FIG. 6 is a foil cover 534 which may cover one or more inlets and/or (as shown here:) outlets, e.g. for hygienic reasons, and which may comprise machine readable information markings Upon use of the capsule 500 the cover 534 is perforated or removed, e.g. by a product forcefully injected into or ejected from the capsule, respectively, providing tamper-evidence and preventing an accurate machine reading of the information markings originally present.

Referring now to FIG. 7, the capsule 600 comprises a body portion 601, a cap 602 and a cover 634. Different from capsule 500, in the capsule 600 a first divider 635 is provided in the interior space S of the capsule 600 separating the interior space S in a first compartment C1 and a second compartment C2. The shown divider 635 is configured to be attached to the first and second sheets 630, 631 forming the body 601. The divider 635 may be a filter to retain particulate matter, e.g. coffee grounds or tea leaves.

Referring now to FIG. 8, the capsule 700 comprises a body portion 701, a cap 702 and a cover 734. The capsule 700 is provided with an insert 736 within the interior space S. The insert 736 is formed by a divider in the form of two sheets 737, 738 enclosing a compartment C2, therewith separating the interior space S in a first compartment C1 and a second compartment C2. Different from capsule 600, the inset 736 is not attached to another portion of the capsule but forms a "floating" insert in the capsule 700.

Referring now to FIGS. 9A-11, several embodiments of caps for use in one or more of the capsules 500-700 will be discussed. It should be noted that the presented aspects also apply mutatis mutandis to the caps 102, 202, 302 and/or 402 of FIGS. 1A-4B.

Figure 9A:
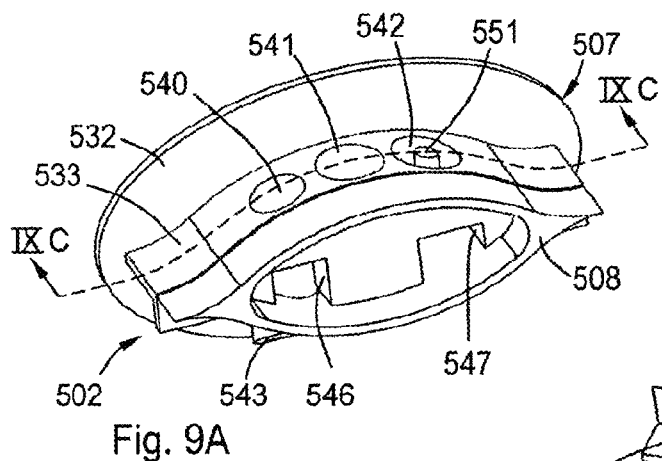
FIGS. 9A-9B are perspective views and FIG. 9C is a cross-sectional view of a cap for a capsule of FIG. 6, 7 or 8.
Figure 9B:
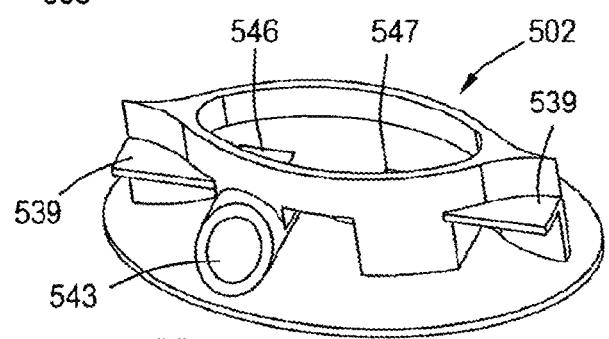
Figure 9C:
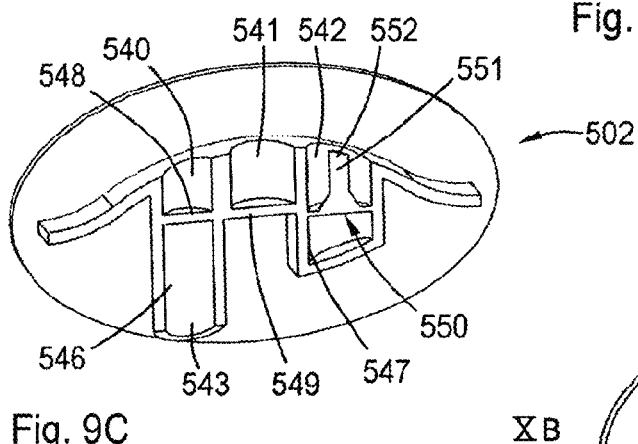
Figure 10A:
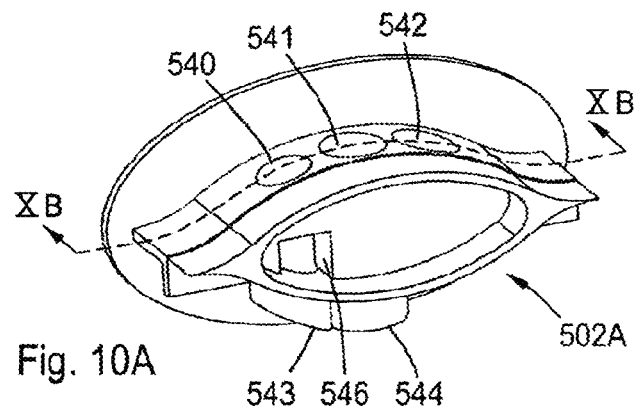
FIGS. 10A-10B are perspective and cross-sectional views of another cap for a capsule of FIG. 6, 7 or 8.
Figure 10B:
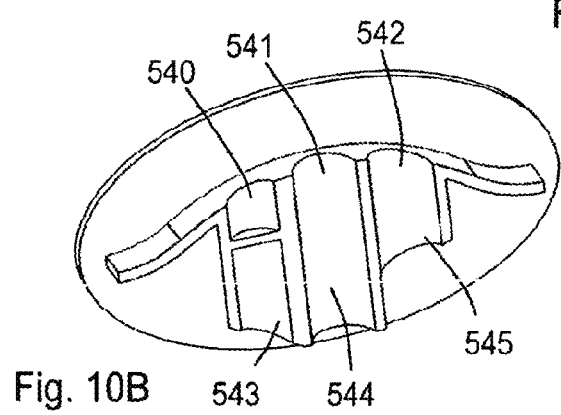
Figure 11:
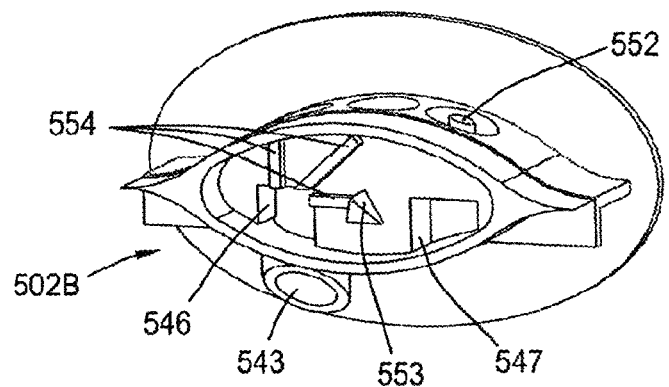
FIG. 11 is a perspective view of another cap for a capsule of FIG. 6, 7 or 8.

FIGS. 9A and 9B are perspective views of cap 502 and FIG. 9C is a cross-sectional view of the cap 502 in the plane IXC indicated in FIG. 9A. Likewise, FIG. 10A is a perspective view of a cap 502A and FIG. 10B is a cross sectional view thereof in the plane XB indicated in FIG. 10A. FIG. 11 is a perspective view of a cap 502B.

The cap 502 (502A, 502B) comprises an end portion 507 with an end plate 532 and a conduit block 533, and a hollow sleeve portion 508. The end plate 532 and optional wings 539 define abutments for the sleeve 504 of the body 501 (not shown here).

The conduit block 533 comprises one or more (here: three) inlets 540-542 for coupling to a corresponding outlet for a fluid of an apparatus, one or more outlets 543-545 for dispensing a product. In the conduit block 533, one or more connections (e.g. 546 and 547, respectively) between (one or more compartments of) the interior space S of a capsule and an outlet (e.g. 543) or an inlet (e.g. 542) are provided. As with the cap 102, the inlets and outlets of the cap 502 extend substantially perpendicular to the main axis of extension of the capsule A.

As shown in FIGS. 9C and 10B, one or more inlets 540-542 may be closed off with walls 548-550 within the conduit block 533 (FIG. 9C). This facilitates standardising connections of both capsule and apparatus while adapting the architecture of the conduits cap to suit a particular product/capsule. It further allows preserving the contents of the capsule. To facilitate removing the obstruction of such optional wall 550 and the inlet 542 with the interior space S of the capsule via connection 547 the wall 550 is provided with a forcing pin or stub 551. The conduit portion 533, wall 550 and stub 551 may be formed such that upon breaking off the wall the freed portion 550, 551 is retained in the conduit portion 533 and prevented from entering the interior space S of the capsule. The (tip 552 of the) stub 551 may comprise one or more information marks, which become modified or illegible by an automated reader upon opening the capsule.

Just as discussed for capsules 100-300, executing a preparation recipe may require introduction of one or more fluids into (a compartment of) the capsule. To dispense a fluid without mixing with a product contained within the capsule one or more bypass conduits may be provided. This may be beneficial for dispensing carbonated beverages, since redirecting or obstructing a flow thereof may cause premature release of the gas. Cap 502A of FIGS. 10A, 10B comprises two bypasses (541-544 and 542-545) and an outlet for a product contained in the capsule, e.g. a syrup, for mixing with carbonated water underway to or in a container e.g. a glass. As in capsule 100, a venturi-based mixing arrangement may also be provided. Cap 502B further comprises a pointed protrusion 553 and three ribs 554, to be discussed below.

Figure 12:
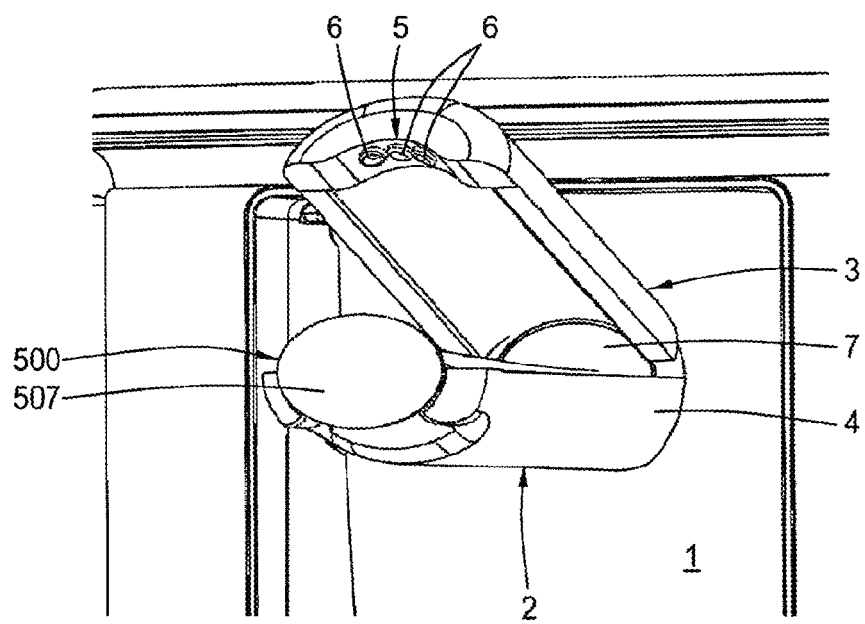
FIG. 12 is a partial perspective view of the capsule of FIG. 6 in an associated apparatus.

FIG. 12 shows a portion of an assembly comprising an apparatus 1 for preparing liquid food products and a capsule 500. The apparatus 1 comprises a receptacle 2 for operatively holding the capsule, here comprising two shells 3, 4 configured to operably receive and hold at least a portion of a capsule of the type 500-700. The apparatus comprises a connector portion 5 which comprises a number of outlets 6 for a fluid. The outlets 6 correspond to inlets 540-542 of the capsule 500 and are provided with a sealing portion to couple with the corresponding inlets 540-542 with a substantially liquid- and gas tight connection. The outlets 6 may be connected to a manifold for supplying fluids such as hot and/or cold water, carbonated water, pressurised gas (e.g. air or CO$_2$). The apparatus further comprises a plunger 7 (see below). The apparatus 1 may comprise a reader (not shown) configured to read information markings provided on the capsule 500 and a controller to process the information and to operate the apparatus accordingly. As shown, the end portion 507 of the capsule 500 may remain visible to an operator from outside of the apparatus 1 during use of the assembly facilitating identifying and/or advertising a product.

Figure 13A:
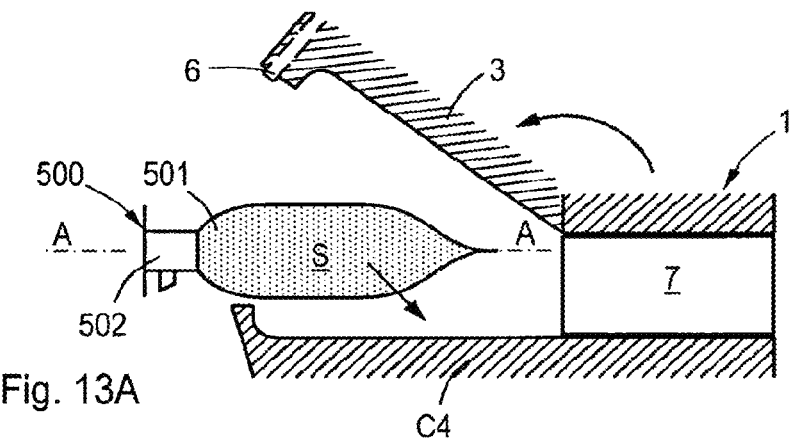
Figure 13B:
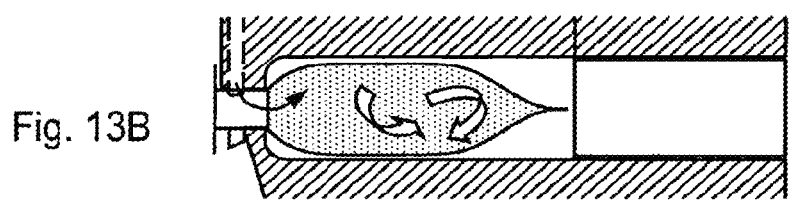
Figure 13C:
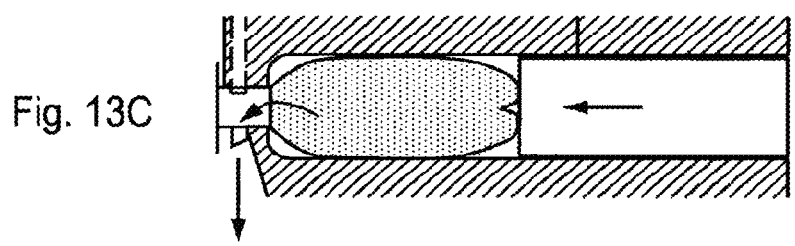

FIGS. 13A-13E indicate a method of preparing a liquid food product with the assembly of a capsule 500 and the apparatus 1. The method comprises: arranging the capsule 500 containing a product to be prepared in the apparatus (FIG. 13A), optionally reading information markings provided on the capsule, and preparing the liquid food product, where appropriate based on the information provided by the information markings. In the shown method preparation of the product involves:

optionally adapting the receptacle to the size of the capsule 500 along the direction of extension A by appropriately positioning the plunger 7;

introducing on or more fluids, e.g. (carbonated) water or a gas, from an outlet 6 into (a compartment in) the interior space S of the capsule 500 via an inlet 540-542. During this, a suitably formed capsule may become pressurised and increase in volume;

allowing at least a portion of the fluid and at least a portion of the product to mix within the interior space S of the capsule 500 (FIG. 13B);

dispensing at least a portion of the fluid, the product and/or the mixture from the container (FIG. 13C). In appropriate cases, dispensing may start when the internal pressure within the capsule has risen sufficient to rupture or tear away the cover 534. It may be observed that the apparatus 1 and the capsule 500 are configured such that the prepared product is dispensed straight from (an outlet 543 of) the capsule 500, without the apparatus 1 requiring a spout. Inadvertent mixing of subsequently produced products is thus prevented.

Figure 13D:
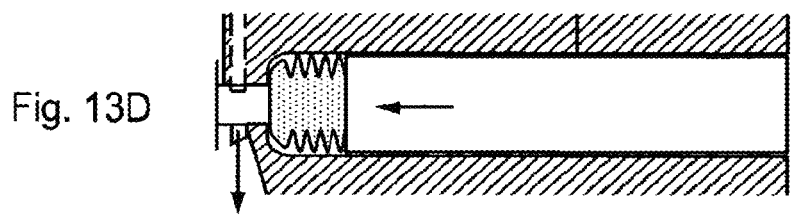
Figure 13E:
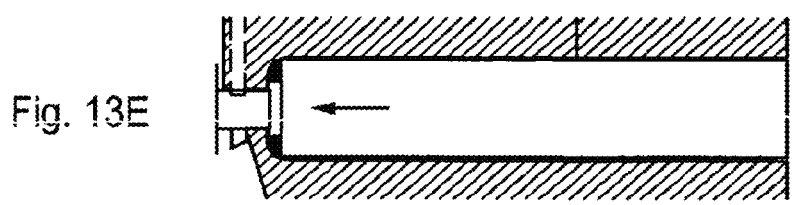

To assist and/or expedite dispensing from the container the shown apparatus 1 comprises and uses an actuator, here a plunger 7, for deforming e.g. compressing a deformable container 500 (FIGS. 13C-13E). Such compressing is facilitated by the cap 502 being substantially rigid, allowing the apparatus 1 to couple with appropriate features of the capsule, e.g. the wings 539 of the cap 520, for counteracting pressure of the plunger 7. A compressed capsule reduces waste volume, further, a capsule once freed from the apparatus is likely to relax somewhat and therewith may suck liquid product back into the capsule. Thus, leaking is prevented at least initially after removing the capsule.

Such method of preparation is very well suited for preparation of beverages from powders, syrups or concentrates, e.g. soft drinks, cocoa, smoothies and/or alcoholic beverages.

Upon closing the receptacle and/or opening an inlet and/or outlet of the capsule information markings may be deformed and/or destroyed so as to prevent reuse of the capsule. This is most relevant for a capsule which is substantially not deformed during use, since deformation of the capsule, e.g. compressing, may generally indicate prior use to consumer and apparatus alike.

An apparatus configured for use with a capsule of FIGS. 1-6C may comprise an actuator for rearranging the first and second parts between their first, second and/or third etc. states.

Since the inlets and outlets of the shown embodiments are oriented substantially perpendicular to the axis A and the manipulation compression is operational in the direction of the axis A, interference between manipulation and executing a recipe or dispensing may be minimal.

FIGS. 14A-14E show a method of brewing coffee as a method for preparing a product with capsule 600 of FIG. 7. The capsule 600 contains coffee in the second compartment C2 which is separated from an inlets and outlets by a filter divider 635. The interior space S of the capsule 600 is otherwise preferably evacuated and/or provided with a protective atmosphere to preserve the product.

The capsule 600 is arranged in the apparatus 1 (FIG. 14A) and information markings on the capsule may be read to identify a suitable brewing processes.

Figure 14A:
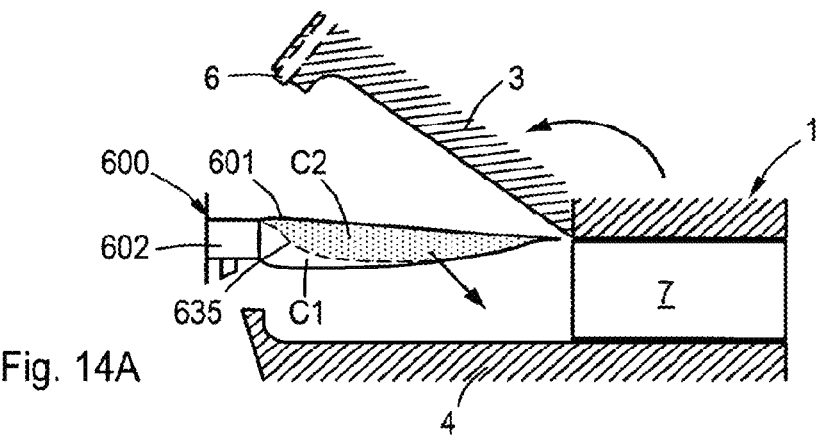
Figure 14B:
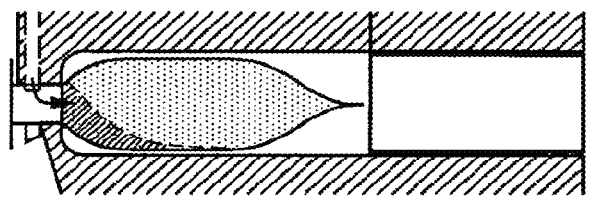
Figure 14C:
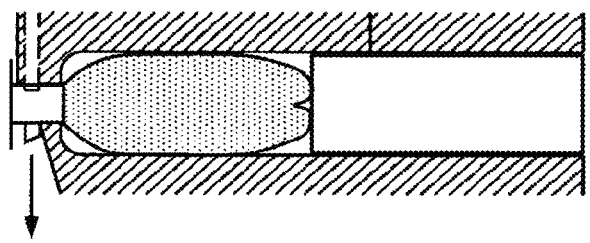
Figure 14D:
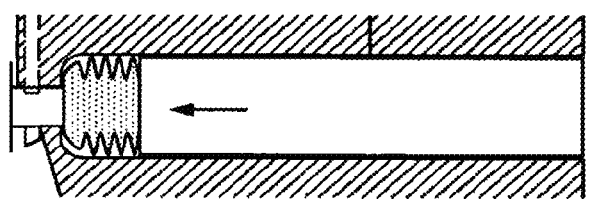

The capsule 600 is opened, possibly destroying any information markings, and hot water is introduced into the first compartment C1 of the capsule 600. The water is left to permeate the filter 635 and to wet the coffee in the compartment C2 (FIG. 14B). The capsule 600 is flexible, folded or somewhat elastic to allow the coffee to swell within the capsule 600. At a desired time the brewed product (coffee) may be dispensed from the capsule. The capsule may be sized to comprise the contents of a full cup of coffee or only a fraction thereof. In the latter case dispensing of the brewed product may include introduction of additional water or mixing with water dispensed via a bypass. Shown in FIGS. 14C-14D is again forced dispensing by compressing the container. Coffee grounds are retained by the filter 635 within the capsule at the end of the brewing process.

Such capsule and method are also very well suited for brewing espresso or tea and/or preparing other extracts. Sweetener or sugar and/or creamer or milk may also be dispensed via a bypass conduit.

Figure 15A:
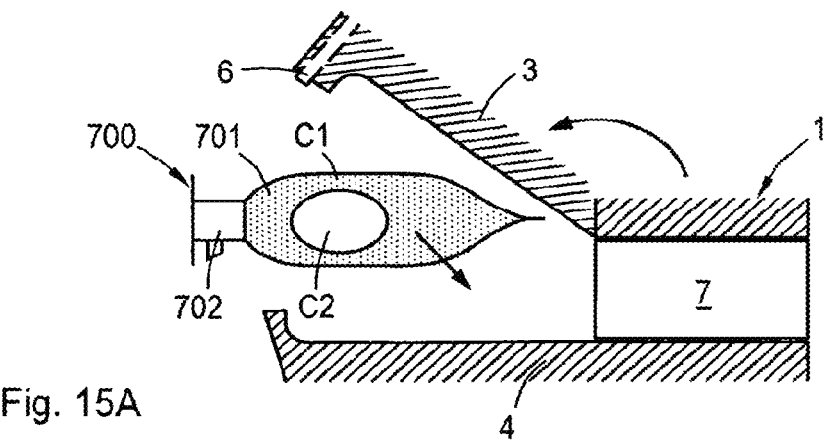
Figure 15B:
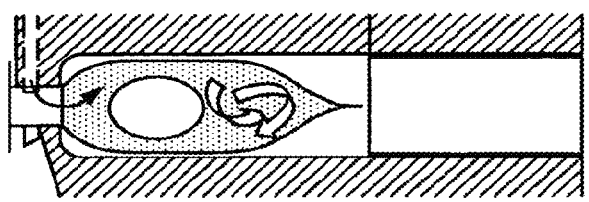
Figure 15C:
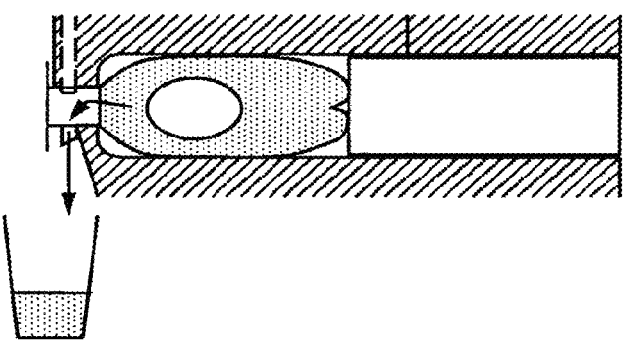
Figure 15D:
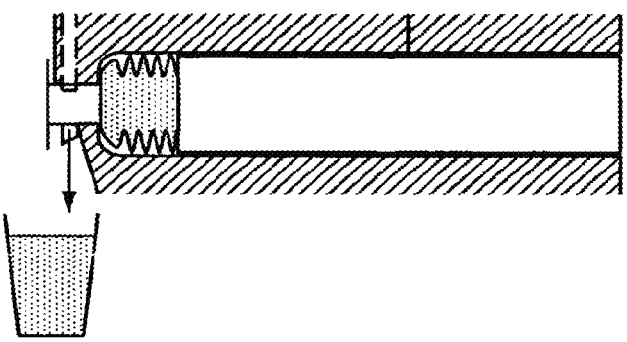

FIGS. 15A-15D show a method of preparation of a product with the capsule 700 of FIG. 8. The capsule 700 is arranged in the apparatus 1 (FIG. 14A) and information markings on the capsule 700 may be read to identify a suitable preparation recipe. Next a fluid, e.g. water or carbonated water is introduced into the first compartment C1 and allowed to mix with the product contained therein (FIG. 15B). The mixed product is then dispensed from the capsule. In case the dividing wall 737, 738 of the insert is not dissolved (fast enough) in the mixture in the first compartment C1, forced dispensing with a plunger 7 may be applied (FIG. 15C). Since the insert is "floating" within the compartment C1 this compartment will be emptied first, until substantially only the insert remains. Upon continued compression by the plunger 7 the insert will burst such that its contents can be dispensed, allowing to dispense a dual-layered product (FIG. 15D).

Similar effect may be achieved with destructing the divider of a capsule 600 having a non-permeable divider 635 or a capsule having an insert 736 which is attached to a portion of the container at one or more positions.

To facilitate destructing the divider 635, 737, 738, the capsule may comprise a destructor such as the protrusion 553 of cap 502B of FIG. 11. This may reduce load on the apparatus and increase reliability of the desired rupturing. To ensure the possibility of fluid flow between a wall or a divider and a cap 502-702, a cap may comprise separators such as the ribs 554 (see cap 502B of FIG. 11) to provide a channel for fluid.

Such capsule and method of preparation are particularly suited for preparation of cappuccino, (alcoholic or non-alcoholic) cocktails or hot cocoa with cream. Soups with croutons are also conceivable, with the croutons comprised in an insert, which insert should be ruptured and the croutons dispensed before being crumbled by the plunger 7.

The invention is not restricted to the above described embodiments which can be varied in a number of ways within the scope of the claims. For instance a capsule of the type 100-400 may comprise at least one divider for dividing the volume of the interior space in at least a first compartment and a second compartment. Said divider may be configured, e.g. attached to one of the first and second parts, such that in the first state of the first and second parts the first compartment and the second compartment are separated and in the second state of the first and second parts the first compartment and the second compartment are in fluid communication with each other.

This allows mixing of contents contained within the capsule at a predetermined time, e.g. prior to introduction of a fluid to the contents.

A capsule of such type may further comprise an insert, e.g. a floating insert and be arrangeable in a third state (relative position of the parts) wherein said insert may enter (e.g. fall, be pushed or be pulled) a compartment into which it cannot fit in the first and second state. Upon returning the capsule to the second state the insert may be ruptured, e.g. with the aid of a destructor, so as to free its contents into the interior space of the capsule and/or for dispensing.

A divider may comprise any desired characteristic dependent on its desired function(s), e.g. it may be soft, flexible, rigid, closed and/or partially open e.g. as a filter, etc. A divider may be substantially permanent, e.g. at least for the desired shelf-life of the capsule, and it may be degradable e.g. soluble.

A capsule of the type 100-400 may also be wholly or partially compressible as described above with reference to FIGS. 13A-15D. A capsule of the type 500-700 may also comprise a movable actuator, e.g. a mixer. For reliability the actuator may be attached to a substantially rigid cap. In case the mixer extends into the capsule not further than a sleeve 508 of a cap 502 or substantially identical embodiment, breaking off of the mixer in pieces which may enter the product to be prepared may be prevented. For safety reasons, any actuator and/or divider may be provided with one or more weak spots or regions, such that in case of fracture the fragments are likely to be too large to pass through an outlet so that they should not end up in the prepared and dispensed product.

Elements and aspects discussed for or in relation with a particular embodiment may be suitably combined with elements and aspects of other embodiments, unless explicitly stated otherwise.

The invention claimed is:

1. A capsule for holding in an interior space a portion of a product for preparing a food product, the capsule comprising:
   a first part and a second part, wherein the first part and the second part are arranged along a direction of extension and moveable relative to one another between a first position and a second position,
   wherein the first and second parts define at least a portion of the interior space,
   wherein the capsule comprises at least one divider for dividing the interior space into a plurality of separate compartments,
   wherein at least one of the first and second parts of the capsule comprises a substantially rigid connector portion with at least one inlet for connecting to a food product preparation apparatus,
   wherein:
      in the first position, the first and second parts cooperate to block the at least one inlet from fluidically associating the interior space and the food product preparation apparatus; and
      in the second position, the first and second parts cooperate to fluidically associate the interior space and the food product preparation apparatus to define a first flow direction through the at least one inlet,
   wherein the capsule is configured to be deformable for being emptied by compression of the capsule, and
   wherein the capsule comprises a destructor arranged at least partially within the interior space for destructing said at least one divider.

2. The capsule of claim 1, wherein the connector portion comprises at least one outlet, and wherein the at least one outlet defines a second flow direction for a food product to be dispensed, which second flow direction extends more than about 45 degrees to the direction of extension of the capsule.

3. The capsule of claim 2, wherein the first and second flow directions extend at least one of substantially parallel and in a substantially direct line.

4. The capsule of claim 1, wherein the capsule comprises an information portion comprising machine readable information markings;
   wherein the information portion is formed such that at least upon opening of the capsule for preparing said food product, the capsule is modified so as to present at least one of no information markings, modified information markings, or illegible information markings to the apparatus.

5. The capsule of claim 1, wherein said connector portion comprises a plurality of inlets for a fluid wherein each of the said inlets is configured to couple at least substantially liquid tight to a corresponding outlet for a fluid of the apparatus and wherein said connector portion comprises at least one outlet for a fluid.

6. The capsule of claim 1, wherein the first part and the second part are slideable relative to one another between the first position and the second position, wherein in the first position the at least one inlet for a fluid is at least one of inaccessible or closed, and wherein in the second position the at least one inlet for a fluid is at least one of accessible, openable, or open.

7. The capsule of claim 6, wherein in the first position at least one outlet for a fluid is at least one of inaccessible or closed and wherein in the second position the at least one outlet for a fluid is at least one of accessible, openable, or open.

8. The capsule of claim 6, wherein in the first position an information portion is attached to both the first part and the second part and wherein the capsule is formed such that in the second position said information portion is modified with respect to at least one of the first and second parts.

9. The capsule of claim 6, wherein in the first position the first part and the second part define a first volume and in the second position the first and second parts define a second volume larger than the first volume.

10. The capsule of claim 9, wherein the first part and the second part are moveable relative to one another across the first position, the second position, and a third position, and wherein in the third position the first part and the second part define a third volume different from the first volume and the second volume, and at least one of a further inlet or a further outlet for a food product is at least one of accessible, openable, or open.

11. The capsule of claim 1, wherein the capsule comprises a movable actuator arranged at least partially in the interior space and being configured to be operable from outside the interior space.

12. An assembly for preparing a portion of a food product, the assembly comprising:
   a capsule, the capsule comprising:

a first part and a second part, wherein the first part and the second part are arranged along a direction of extension and moveable relative to one another between a first position and a second position, wherein the first and second parts define at least a portion of an interior space, wherein at least one of the first and second parts of the capsule comprises a substantially rigid connector portion with at least one inlet for connecting to a food product preparation apparatus, wherein:

in the first position, the first and second parts cooperate to block the at least one inlet from fluidically associating the interior space and the food product preparation apparatus; and in the second position, the first and second parts cooperate to fluidically associate the interior space and the food product preparation apparatus to define a first flow direction through the at least one inlet; and an apparatus for preparing a food product comprising a receptacle for operatively holding the capsule, wherein said receptacle comprises at least one of a deformable portion and an actuator for manipulating at least a portion of the capsule, wherein said receptacle is configured to operably receive at least a portion of the capsule, and wherein said apparatus comprises a manipulator for moving at least one of the first part or the second part of the capsule from the first position to the second position.

13. The assembly of claim 12, wherein the capsule has an information portion with machine readable information markings, and wherein the apparatus includes a reader configured to read said information markings; and wherein upon opening of the capsule for preparing said food product with said apparatus, said information portion is modified so as to present at least one of no information markings, modified information markings, or machine-illegible information markings to the reader.

14. The assembly of claim 13, wherein said connector portion provides a plurality of inlets for a fluid and at least one outlet for a fluid, wherein said apparatus comprises at least one outlet for a fluid corresponding to an inlet of the capsule, and wherein said at least one outlet of the apparatus and said corresponding inlet of the capsule are configured to couple with an at least substantially liquid tight connection.

15. The assembly of claim 12, configured such that, in use, at least a portion of the capsule is visible to an operator from outside of the apparatus.

\* \* \* \* \*